US008748745B2

(12) United States Patent
Imes et al.

(10) Patent No.: US 8,748,745 B2
(45) Date of Patent: Jun. 10, 2014

(54) TERMINAL CONNECTOR FOR A WALL MOUNTED DEVICE

(75) Inventors: Kevin R. Imes, Austin, TX (US); Xiyin Yao, Austin, TX (US)

(73) Assignee: Allure Energy, Inc., Austin, TX (US)

( * ) Notice: Subject to any disclaimer, the term of this patent is extended or adjusted under 35 U.S.C. 154(b) by 0 days.

(21) Appl. No.: 13/600,111

(22) Filed: Aug. 30, 2012

(65) Prior Publication Data
US 2014/0060876 A1 Mar. 6, 2014

(51) Int. Cl.
H01R 13/46 (2006.01)
F24F 11/02 (2006.01)
G05D 23/19 (2006.01)

(52) U.S. Cl.
USPC ............................................ 174/59; 236/1 C

(58) Field of Classification Search
CPC ... F24F 11/0009; F24F 11/0012; F24F 11/02; F24F 11/0086; F24F 11/053; H01R 4/28; G05D 23/19
USPC ............................................ 174/59; 236/1 C
See application file for complete search history.

(56) References Cited

U.S. PATENT DOCUMENTS

| 1,568,584 A * | 1/1926 | Blankenship ................ 200/51.1 |
| 2,042,633 A * | 6/1936 | Richardson ..................... 439/444 |
| 2,427,965 A * | 9/1947 | Henderson ........................ 174/59 |
| 2,931,006 A * | 3/1960 | Klumpp, Jr. ..................... 439/710 |
| 2,960,677 A * | 11/1960 | Hopkins et al. ................ 439/817 |
| 3,194,957 A * | 7/1965 | Caldwell et al. ............... 362/264 |
| 3,237,148 A * | 2/1966 | Ege ................................ 439/460 |
| 3,531,759 A * | 9/1970 | Hansen ........................... 439/599 |
| 3,675,183 A * | 7/1972 | Drake ............................ 439/457 |
| 3,808,602 A * | 4/1974 | Foster et al. ........................ 360/6 |
| 4,150,718 A * | 4/1979 | Kolbow et al. ................. 165/238 |
| 4,437,716 A * | 3/1984 | Cooper ............................. 439/31 |
| 4,645,286 A * | 2/1987 | Isban et al. ..................... 439/571 |
| 4,669,654 A * | 6/1987 | Levine et al. ................ 236/46 R |
| 5,729,442 A | 3/1998 | Frantz |
| 5,964,625 A * | 10/1999 | Farley ........................... 439/817 |
| 6,175,078 B1* | 1/2001 | Bambardekar et al. ........ 174/484 |
| 6,353,180 B1* | 3/2002 | DeBartolo et al. ............ 174/483 |
| 6,483,028 B2* | 11/2002 | DeBartolo et al. ............ 174/483 |
| 6,623,311 B1* | 9/2003 | Dehan ........................... 439/721 |
| 2006/0283965 A1 | 12/2006 | Mueller et al. |
| 2007/0221741 A1 | 9/2007 | Wagner et al. |
| 2012/0126020 A1* | 5/2012 | Filson et al. ....................... 236/1 |
| 2013/0087629 A1* | 4/2013 | Stefanski et al. ................. 236/1 |
| 2013/0099010 A1* | 4/2013 | Filson et al. ...................... 236/1 |

OTHER PUBLICATIONS

"A step-by-step guide to installing the 1st generation Nest Learning Thermostat," Article #1161, 2013 Nest Labs. pp. 1-6.

* cited by examiner

Primary Examiner — Jeremy C Norris
Assistant Examiner — Nathan Milakovich
(74) Attorney, Agent, or Firm — Dickinson Wright PLLC

(57) ABSTRACT

A wall mounted device includes a housing having a rear surface that is intended to face a wall to which the device is to be mounted. The housing also has an interior portion and an opening formed therein to allow wires from the wall to pass therethrough for communication with the interior housing. The opening has a center point. At least one terminal block may be disposed in the interior portion of the housing and includes a plurality of terminals that are configured to engage a wire to form an electrical connection. Each of the plurality of terminals can be located equidistant from a point within the opening such that the lengths of wire in the housing are reduced.

6 Claims, 2 Drawing Sheets

TERMINAL CONNECTOR FOR A WALL MOUNTED DEVICE

CROSS-REFERENCE TO RELATED APPLICATIONS

The present application is related to Applicant's concurrently filed U.S. patent application Ser. No. 13/600,166, entitled a "Resource Manager, System and Method for Communicating Resource Management Information for Smart Energy and Media Resources" and filed on Aug. 30, 2012, the disclosure of which is expressly incorporated by references as though set forth fully herein.

TECHNICAL FIELD

The present invention relates generally to an improved terminal design for a wall mounted device, which allows the terminal to be mounted closer and more efficiently to the wall.

BACKGROUND OF THE INVENTION

Wall mounted electronic devices, such as thermostats, alarms and the like are well known. These wall mounted devices typically employ terminal blocks to allow the device to be electrically connected to wires located in the wall to which they are mounted. While these wall mounted devices are known to be manufactured in different sizes and shapes, they generally have an opening in the back that allows the wires from the wall to be connected to the terminal block in the housing by passing through the opening. The openings in the back of these wall mounted devices are generally elongated with a rectangular or square shape. Also, the terminal blocks utilized in these wall mounted devices are typically elongated and oriented in a linear arrangement such that they lie parallel to the sides of the opening in the back of the housing.

The configuration of the openings in the back of these wall mounted devices in combination with the terminal block located in the housing requires wires of different lengths to effectuate a connection with each of the terminals that make up the terminal block. For example, the wires that connect to the terminals on the ends of the terminal block must be longer than the wires that connect to the interior terminals on the terminal block. There thus is generally more wire in the housing or between the wall and the housing than is necessary, which can bunch up and prevent the back of the wall mounted device from being closely mounted to the wall. This can be undesirable and aesthetically unattractive.

Additionally, the connection of the wires to the terminals of the terminal block in most existing wall mounted designs requires a cumbersome and time consuming attachment process. Specifically, many existing terminal connections utilize a screw connector that requires loosening of a screw to allow a wire to be inserted into the terminal. Once the wire is in place, the screw must be tightened with a screw driver or the like to secure the wire firmly in the terminal.

It would therefore be desirable to provide a wall mounted device that overcomes these disadvantages.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE INVENTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features, but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

Figure 1:
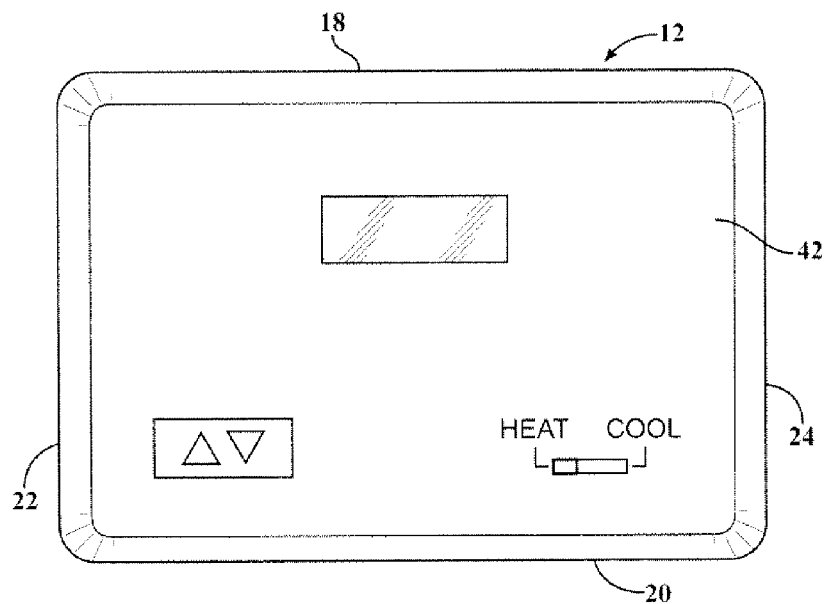
FIG. 1 is a front view of a wall mounted device according to an aspect of the disclosure.
Figure 2:
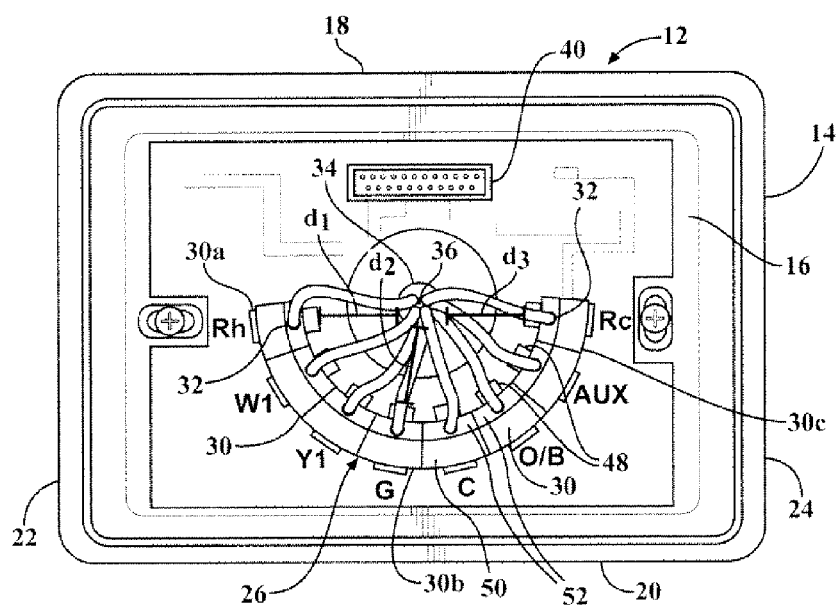
FIG. 2 is a front view of the interior of the housing of the wall mounted device according to an aspect of the disclosure.
Figure 3:
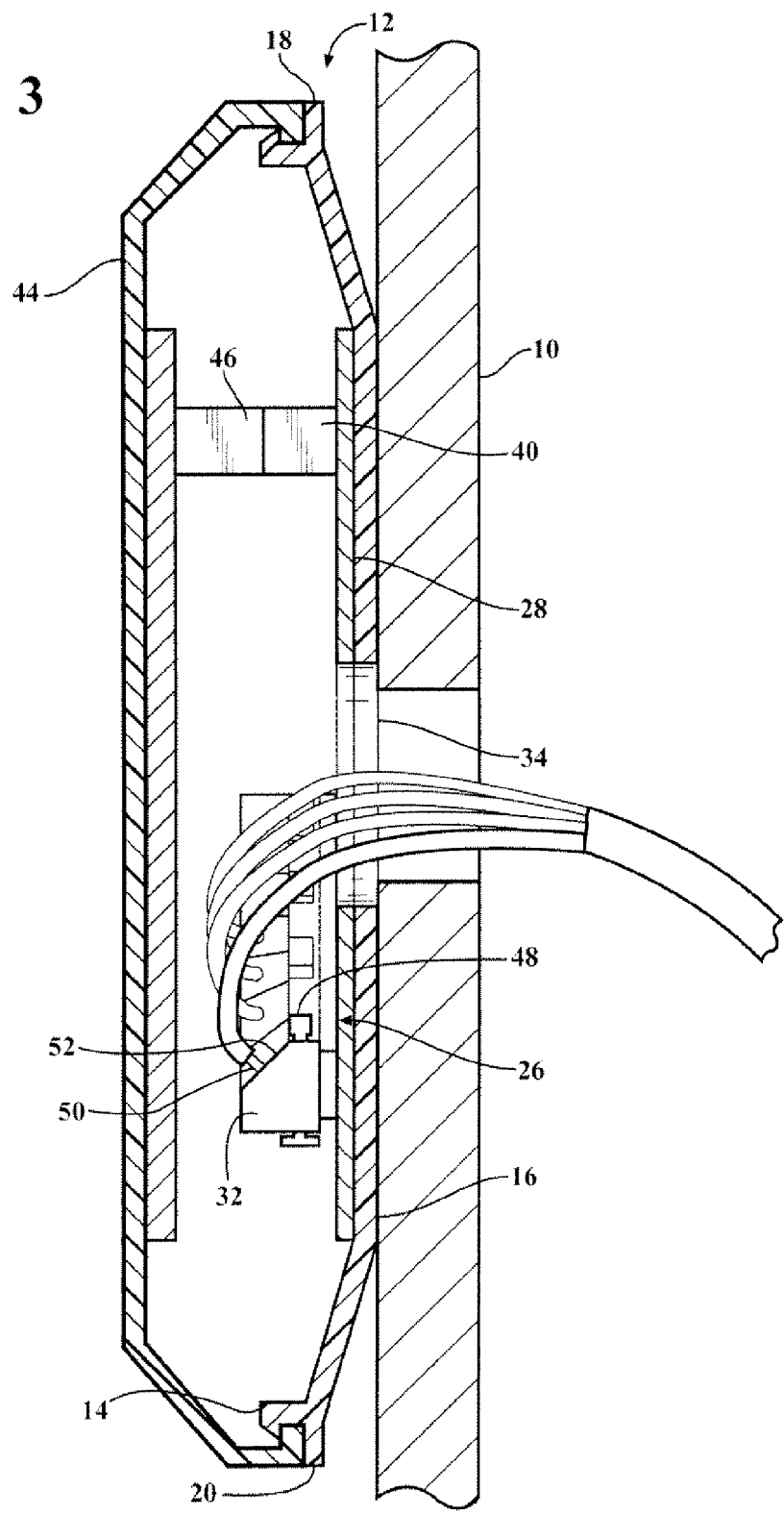
FIG. 3 is a cross-sectional side view of the wall mounted device of FIG. 1.

FIGS. 1 through 3 illustrate an electronic device that can be mounted to a wall 10. In accordance with one aspect, the electronic device includes a housing 12. The housing 12 may be part of an electronic device that is one of or any combination of an energy management system, an energy management device, a network device, a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a media server, a network server, a network storage device, a wireless speaker, a customer engagement platform, a customer engagement portal, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server, which can include waste, water, power or combinations thereof, an energy substation, a news media server, a weather server, an advertisement server or service provider, a network radio server or service provider, a network media server or service provider, a music server or server provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power management device, a power measurement unit (PMU), an air handler, a wireless air damper, a humidity control system, a heat and motion sensing device, a smart power outlet, a switch router, a wireless router, an automobile or transportation device, a network communication device, or any other suitable device or system, and can vary in size, shape, performance, functionality, and price.

In accordance with one aspect, the housing 12 includes a front surface 14, a rear surface 16, a top wall 18, a bottom wall 20, and a pair of opposing side walls 22, 24. The front surface 14 may include a terminal block 26 disposed thereon. According to one aspect, the terminal block 26 may be in communication with a printed circuit board 28 disposed therein. The terminal block 26 may have an arcuate shape, such as a u-shape or semi-circular shape. However, any other arrangements of the terminal block 26 could also be used. A terminal block 26 could also consist of multiple terminals that are individually attached and oriented within the housing 12. The terminal block 26 may include a plurality of individual terminals 30 each having an orifice 32. Each terminal 30 can allow for an individual electrical connection as will be understood by one of ordinary skill in the art and as described in more detail below.

In accordance with a further aspect, the housing 12 can include an opening 34 disposed therethrough that enables wires, such as HVAC wires, located in the wall 10 to pass through the opening 34 for communication with the terminal block 26. The opening 34 may be circular, oval, square, rectangular or a variety of other suitable shapes. In accordance with one aspect, the terminal block 26 is configured such that each terminal 30 is disposed equidistant from at least one point of the opening 34. For example, the opening 34 could be configured as a circle and the terminal block 26 could be oriented in a generally arcuate shape such that the orifice 32 of each of the terminals 30 is disposed equidistant from the center point 36 of the opening 34. This arrangement can help prevent bunching of excess wires as the same length of wire can be utilized to make a connection between the wall and each terminal. This can allow the housing 12 to be mounted close to the wall and provide a more orderly arrangement of wires. In accordance with this aspect, the terminal 30a can be disposed a distance (d1) from the center point 36, the terminal 30b can be disposed a distance (d2) from the center point 36, and the terminal 30c can be disposed a distance (d3) from the center point 36 where the distances (d1), (d2), and (d3) are the same. In accordance with this example, the shape of the opening generally matches the shape of the terminal block 26 such that the wires from the wall 10 that pass through the opening 34 can each have the same length and can be "fanned" out to make their respective connection with each of terminals 30. Other configurations of the opening 34 and the terminal block 26 could also be employed. For example, the opening 34 could be configured as a half circle and the terminal block 26 could be oriented in a generally arcuate shape such that each of the terminals is located equidistant from a midpoint of the linear side of the half circular shaped opening. Other combinations of opening shapes and terminal block shapes may be utilized that require less wire from the wall to be disposed within the interior of the housing 12 or minimizes excess wire and bunching thereof between the housing and the wall.

The housing 12 may serve as all or part of an electronic device. In accordance with one aspect, a cover plate 42 could be removably attached to the housing 12 to close off access to the interior of the housing, including the terminal block 26. In accordance with another aspect, the housing 12 can include a connector 40 to allow attachment of a front structure 44 at a front connector 46. Obviously, other suitable structures for effectuating a connection could be employed. By this connection, the front structure 44 when electrically connected to the housing 12 could form a single electronic device or alternatively, the housing 12 and the front structure 44 could form two separate devices that are attached. For example, the housing 12 could serve as a fully functional thermostat while the front structure may embody a multimedia device.

As shown, each of the terminals 30 can allow for an easy and quick connection of a wire thereto without the need for tools to effectuate a secure connection. According to one aspect, each of the terminals 30 may include a portion 48 that can be pushed inwardly to expose the orifice 32 such that a wire can be inserted therein to make the connection. When the portion 48 is released, a spring force urges the terminal toward a position closing off the orifice 32 such that a wire inserted therein is secured by the walls of the orifice as will be readily understood by one of ordinary skill in the art. It will also be understood that other suitable mechanism for quickly exposing the orifice may be employed.

As shown in the drawings, in accordance with one aspect, each of the terminals 30 has a top surface 50 that lies generally parallel to the rear surface 16 of the housing 12 and a front surface that has an angled portion 52. In one aspect, the orifice 32 of each terminal 30 is formed in the angled portion 52 to facilitate ease of insertion of the wire thereto.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A wall mounted device, comprising:
 a housing extending between a top wall and a bottom wall and having a rear wall that is intended to lie adjacent a wall to which the device is to be mounted;

a cover plate secured to said rear wall to define an interior chamber;

an opening formed in the housing that allows wires from said wall to pass into said interior chamber of said housing;

a terminal block having a body disposed in said interior chamber substantially between said opening and said bottom wall and having a generally arcuate shape and comprising a plurality of terminals having apertures in a front face thereof and converging sides abutting one another on respective radials from said opening to form electrical connections with the wires;

each of said plurality of terminals being located on a semi-circle and equidistant from at least one point of said opening such that the length of wire in said interior chamber is reduced.

2. The device of claim 1, wherein said opening is circular in shape.

3. The device of claim 1, where said opening and said terminal block have corresponding shapes.

4. A wall mounted device, comprising:

a housing extending between a top wall and a bottom wall and having a rear wall that is intended to lie adjacent a wall to which the device is to be mounted;

a cover plate secured to said rear wall to define an interior chamber;

an opening formed in the housing that allows wires from said wall to pass into said interior chamber of said housing;

a printed circuit board disposed on said rear wall;

a terminal block electrically connected to and attached to said printed circuit board;

said terminal block disposed substantially between said opening and said bottom wall and comprising a plurality of terminals having apertures in a front face thereof and converging sides abutting one another on respective radials from said opening to form electrical connections with the wires;

each of said plurality of terminals being located on a semi-circle and equidistant from at least one point of said opening such that the length of wire in said interior chamber is reduced, each of said terminals defining an orifice for receiving one of the wires from said opening and for electrically connecting the wires to said printed circuit board;

each of said terminals including a spring loaded actuator disposed in said orifice thereof that can be depressed to expose said orifice of said terminal to allow for connection of said wire.

5. A wall mounted device comprising;

a housing extending between a top wall and a bottom wall to define a rear wall;

said rear wall of said housing defining a plurality of fastener apertures for supporting said housing against a wall, said rear wall of said housing including a projection defining a groove, a cover plate having an edge circumscribing said cover plate, a rim extending along said edge of said cover plate for engaging said groove of said projection to secure said cover plate to said rear wall to define an interior chamber, said rear wall of said housing defining an opening extending therethrough for passing a plurality of wires from the wall to said interior chamber, said cover plate including a display for visually conveying information, said cover plate including a temperature control and a heat selector switch, said cover plate including a front connector projecting into said interior chamber and electrically connected to said display and said temperature control and said heat selector switch, a printed circuit board disposed on said rear wall and defining a bore axially aligned with said opening in said rear wall, said printed circuit board presenting a plurality of rectangular voids aligned with said fastener apertures to provide access to said fastener apertures, a terminal block electrically connected to and attached to said printed circuit board, said terminal block disposed substantially between said opening and said bottom wall in a semi-circle about said opening and comprising a plurality of terminals having apertures in a front face thereof and converging sides abutting one another on respective radials from said opening, a connector electrically connected to and attached to said printed circuit board and extending into said interior chamber for engaging said front connector for electrically communicating signals from said printed circuit board to said display and signals from said temperature control and said heat selector switch to said printed circuit board, said terminals each having a top surface extending parallel to said rear surface of said housing and an angled portion extending from said top surface toward said bore of said printed circuit board, said angled portion of each of said terminals defining an orifice for receiving one of the wires from said opening and for electrically connecting the wires to said printed circuit board, and said terminals each including a spring in said orifice for receiving and retaining a wire inserted therein.

6. The device of claim 1, wherein each of the plurality of terminals includes a spring loaded actuator disposed in an orifice thereof that can be depressed to expose said orifice of said terminal to allow for connection of said wire.

* * * * *